(12) United States Patent
Chen et al.

(10) Patent No.: US 8,317,373 B2
(45) Date of Patent: Nov. 27, 2012

(54) LUMINOUS DEVICE WITH CHANGEABLE COLOR AND BRIGHTNESS

(75) Inventors: Chin-Feng Chen, Taipei Hsien (TW); Fang-Lun Wu, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 290 days.

(21) Appl. No.: 12/912,762

(22) Filed: Oct. 27, 2010

(65) Prior Publication Data

US 2012/0025734 A1    Feb. 2, 2012

(30) Foreign Application Priority Data

Jul. 28, 2010  (CN) .......................... 2010 1 0239106

(51) Int. Cl.
*F21V 23/04* (2006.01)
(52) U.S. Cl. .......... 362/394; 362/395; 362/276; 362/84; 362/231

(58) Field of Classification Search .................. 362/276, 362/394, 395, 84, 231
See application file for complete search history.

(56) References Cited

U.S. PATENT DOCUMENTS

| | | | |
|---|---|---|---|
| 7,547,119 B2 * | 6/2009 | Kuwana et al. | ............... 362/294 |
| 2010/0238677 A1 * | 9/2010 | de Laine et al. | ............. 362/520 |

* cited by examiner

*Primary Examiner* — Ali Alavi
(74) *Attorney, Agent, or Firm* — Altis Law Group, Inc.

(57) ABSTRACT

A luminous device is provided. The luminous device can be controlled to emit light with different color and brightness. The luminous device is divided into a plurality of areas, a predetermined color and brightness values of the light emitted by the luminous device is stored in data storage of the luminous device. When the luminous device is touched, the luminous device determines the touch area first, and then accesses the corresponding color and luminance value of the determined area from the data storage, and controls the luminous device to emit light with the accessed color and brightness value.

12 Claims, 4 Drawing Sheets

LUMINOUS DEVICE WITH CHANGEABLE COLOR AND BRIGHTNESS

BACKGROUND

1. Technical Field

The present disclosure relates to a luminous device with changeable color and brightness.

2. Description of Related Art

Color and brightness of light emitted from a conventional luminous device can be changed with a predetermined time elapse. However, the color and brightness of the light emitted from such a luminous device is often changed according to a predetermined program, and cannot be adjusted by the user.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
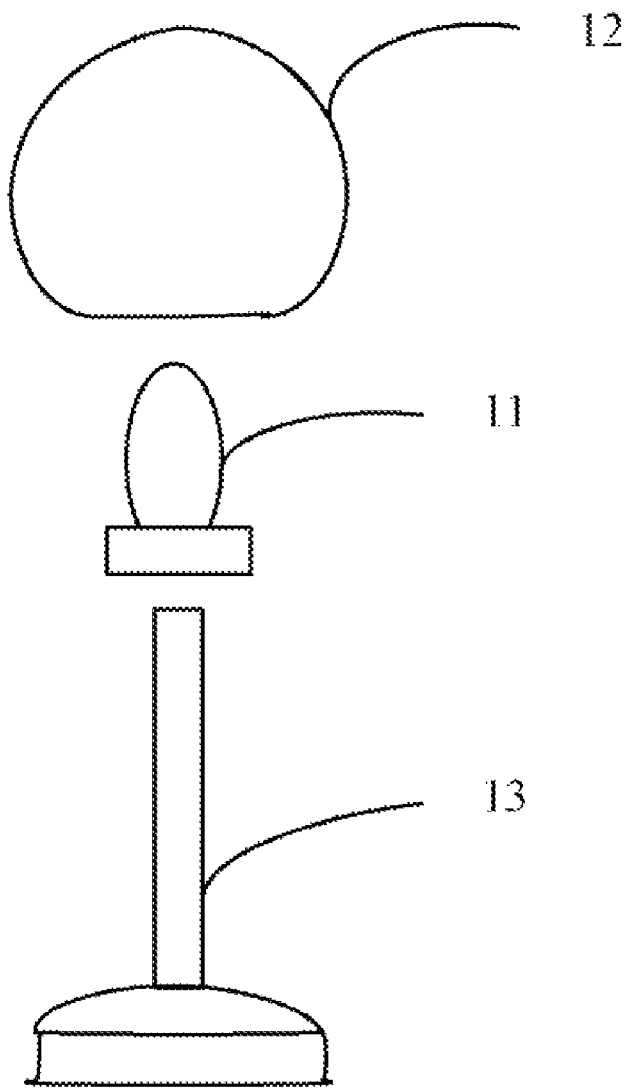
FIG. 1 is a schematic view of a luminous device in accordance with an exemplary embodiment.

FIG. 1 is a schematic view of a luminous device 1 in accordance with an exemplary embodiment. The color and brightness of the light emitted from the luminous device 1 can be changed according to external inputs. The luminous device 1 includes a light source 11, a cover 12, and other necessary components. In this exemplary embodiment, a desk lamp 1 is taken for example. The desk lamp 1 further includes a base 13. The light source 11 is covered by the cover 12. In this exemplary embodiment, the light source 11 consists of a plurality of LEDs. The cover 12 is made of light transmissible material. The cover 12 is divided into a plurality of areas according to coordinates of the cover 12. Each area of the cover 12 is assigned a distinctive color and brightness and is operable to be touched to activate the light source 11 to emit a corresponding color and brightness.

Figure 2:
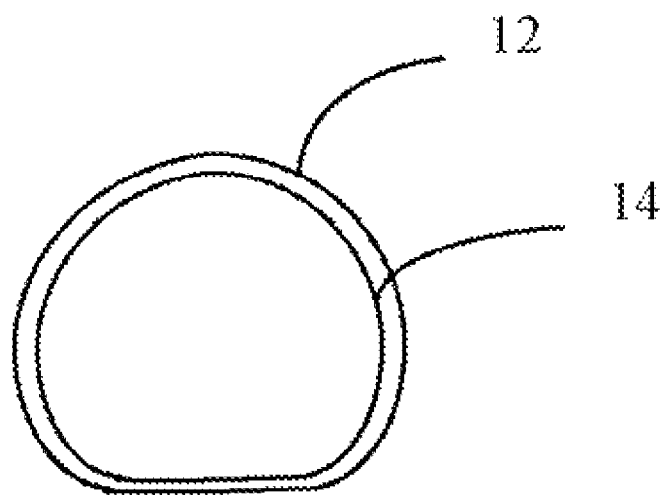
FIG. 2 is a schematic diagram of a cover of the luminous device of FIG. 1.

As shown in FIG. 2, the luminous device 1 further includes a plurality of touch sensors 14. The touch sensors 14 are disposed in the inner surface of the cover 12. The touch sensors 14 generate input signals in response to touch operations on the cover 12. Each area of the cover 12 is assigned at least one of the touch sensors 14 for generating the input signal to activate the light source 11 to emit a corresponding color and brightness when being touched.

Figure 3:
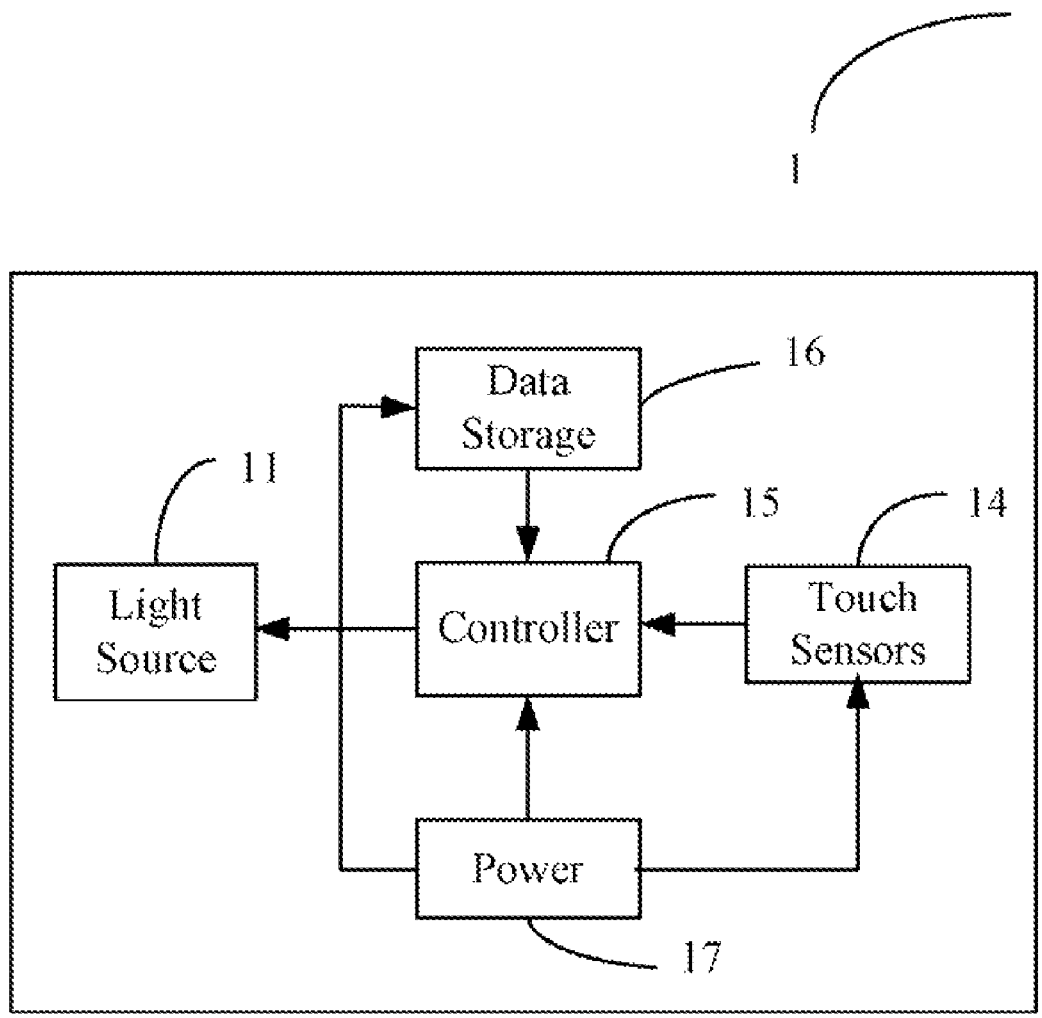
FIG. 3 is a block diagram of the luminous device of FIG. 1.

As shown in FIG. 3, the luminous device 1 further includes a controller 15, a data storage 16, and a power 17. The controller 15 controls the light resource 11 to emit light with different color and brightness. The data storage 16 stores a relationship between each of the areas and the color and brightness values emitted by the light source 11 when each of the areas is touched. The controller 15 periodically scans the touch sensors 14 to determine whether the touch sensors 14 generate the input signal and which touch sensor 14 generates the input signal. Typically, the controller 15 further determines which area the determined touch sensor 14 belongs to and thus determines the touched area on the cover 12. After determining the touched area on the cover 12, the controller 15 accesses the corresponding color and brightness value of the determined area from the data storage 16, and controls the light source 11 to emit the light with the accessed color and brightness value. The power 17 provides power for the light source 11, the controller 15, the data storage 16, and the touch sensors 14.

Figure 4:
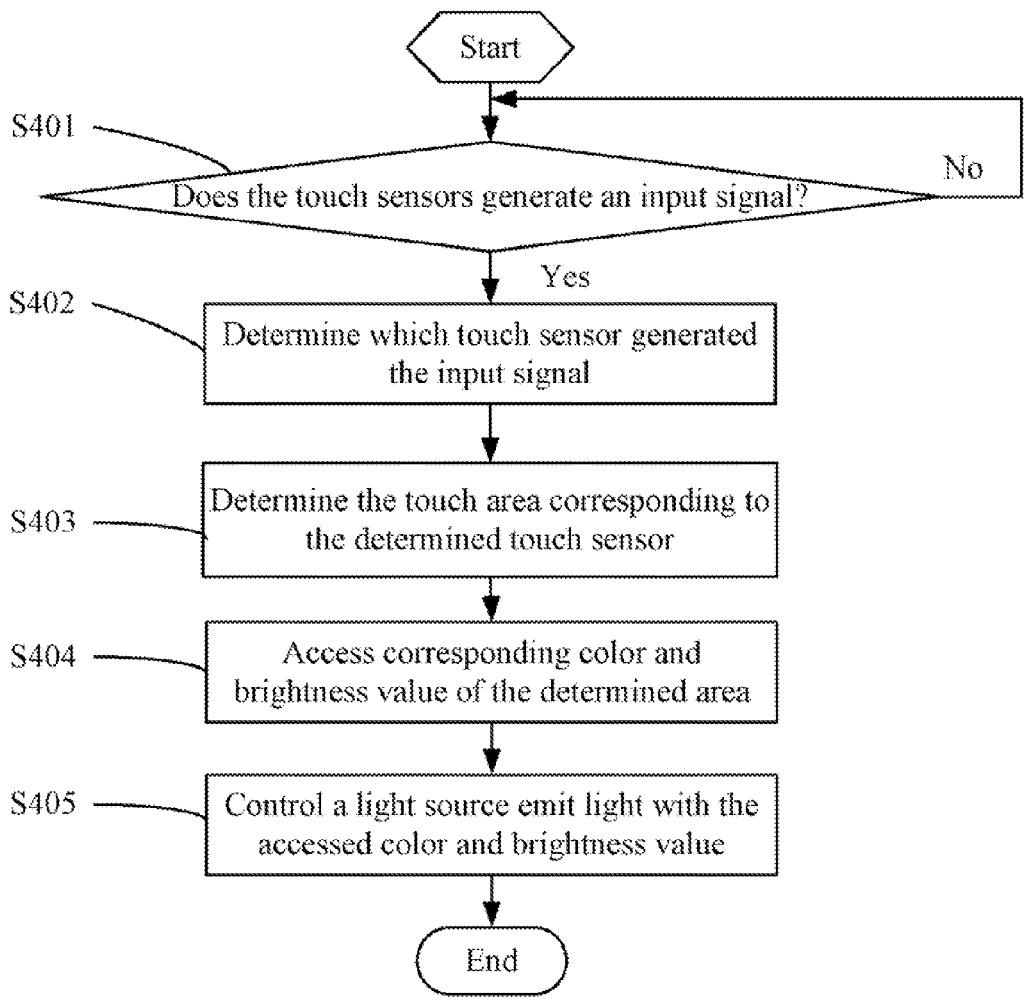
FIG. 4 is a flowchart of a method for controlling the luminous device 1 to emit light with different color and brightness.

FIG. 4 is a flowchart of a method for controlling the luminous device 1 to emit light with different color and brightness. In step S401, the controller 15 detects whether the touch sensors 14 generate an input signal. If the input signal is not detected by the controller, the step goes to itself.

In step S402, the controller 15 determines which touch sensor generated the input signal if the input signal detected by the controller.

In step S403, the controller 15 further determines the touch area corresponding to the determined touch sensor.

In step S404, the controller 15 accesses the corresponding color and brightness value of the determined area from the data storage 16.

In step S405, the controller 15 controls the light source 11 to emit the light with the accessed color and brightness value.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A luminous device comprising:
   a cover being divided into a plurality of areas corresponding to color and brightness values;
   a light source being covered by the cover;
   a plurality of touch sensors for generating input signals in response to touch operations on the cover;
   a data storage for storing a relationship between each of the areas of the cover and color and brightness values emitted by the light source when each of the areas is touched; and
   a controller for detecting whether the touch sensors generate an input signal, determining which touch sensor generated the input signal if the input signal detected by the controller; and further determining the touch area corresponding to the determined touch sensor; accessing the corresponding color and brightness value of the determined area from the data storage, and controlling the light source to emit the light with the accessed color and luminance value.

2. The luminous device as described in claim 1, wherein the luminous device is a desk lamp.

3. The luminous device as described in claim 1, wherein the light source consists of a plurality of LEDs.

4. The luminous device as described in claim 1, wherein the cover is made of light transmissible material.

5. The luminous device as described in claim 1, wherein each area is assigned at least one touch sensor.

6. The luminous device as described in claim 1, wherein the touch sensors are disposed in inner surface of the cover.

7. A method for controlling a luminous device emit light with different color and brightness, the luminous device comprising a light source, a cover, a plurality of touch sensors, and a data storage, the light source being covered by the cover, the cover being divided into a plurality of areas; the plurality of touch sensors for generating input signals in response to touch operations on the cover; the data storage for storing a relationship between each of the areas of the cover and color and brightness values emitted by the light source when each of the areas is touched; the method comprising:

detecting whether the touch sensors generate an input signal;

determining which touch sensor generated the input signal if the input signal detected by the controller;

further determining the touch area corresponding to the determined touch sensor;

accessing the corresponding color and brightness value of the determined area from the data storage; and controlling the light source to emit the light with the accessed color and brightness value.

8. The method as described in claim 7, wherein the luminous device is a desk lamp.

9. The method as described in claim 7, wherein the light source consists of a plurality of LEDs.

10. The method as described in claim 7, wherein the cover is made of light transmissible material.

11. The method as described in claim 7, wherein each area is assigned a plurality of touch sensors.

12. The method as described in claim 7, wherein the touch sensors are disposed in inner surface of the cover.

* * * * *